Patented Aug. 10, 1954

2,686,205

UNITED STATES PATENT OFFICE 2,686,205

MANUFACTURE OF 2:4:4-TRIMETHYL-PENTANAL

Edward James Gasson, Banstead, and Alfred Frank Millidge, Coulsdon, England, assignors to The Distillers Company Limited, Edinburgh, Scotland, a British company No Drawing. Application September 7, 1950, Serial No. 183,651

Claims priority, application Great Britain September 21, 1949

5 Claims. (Cl. 260—601)

The present invention relates to the manufacture of aldehydes by the isomerisation of the corresponding epoxy compounds, and refers in particular to the isomerisation of 1:2-epoxy-2:4:4-trimethyl pentane and the production thereby of 2:4:4-trimethyl pentanal.

The isomerisation of 1:2 - epoxy - 2:4:4 - trimethylpentane with dilute sulphuric acid is known. Hickinbottom and Byers have shown in J. C. S. (1948) p. 1329 that the epoxide reacts in aqueous alcoholic solution with sulphuric acid, to which dinitrophenyl hydrazine has been added, and yields the dinitrophenyl hydrazone of 2:4:4-trimethyl pentanal.

In a further publication Hickinbottom, J. C. S. (1948) p. 1331 reports that when 1:2-epoxy-2:4:4-trimethyl pentane is reacted with dilute sulphuric acid a mixture was obtained which contained the corresponding glycol, and also 2:5-dimethyl - 2:5 - dineopentyl - 1:4 - di - oxan, 2:4:4-trimethyl pentanal and a small amount of an unsaturated alcohol. By not allowing the temperature in the reaction mixture to rise above 30° C. the yield of glycol was increased at the expense of the di-oxan. In the experimental part of this publication there is described that the concentration of the sulphuric acid used for the isomerisation was 22% percentage by volume. The temperature of the mixture was allowed to rise to about 60° C. As a result of the reaction the product contained a predominant amount of di-oxan compound, whilst the pentanal yield was only about 25%. These publications implied that the yields of aldehyde obtainable by the reaction are comparatively small and of little economic value.

We have now found that the isomerisation can be carried out with advantage and with greater yields of the desired aldehyde when it is effected in a two-phase reaction mixture wherein strong acids of more than 25% and preferably more than 40% concentration are used, and the reaction temperature is kept below 40° C. As acids for example aqueous sulphuric acid, phosphoric acid and para-toluene sulphonic acid may be used. The above concentrations refer to the proportion by volume of acid in the acid phase and in the case of phospheric and the paratoluene sulphonic acid may advantageously be up to 100%. The same applies to sulphuric acid provided that the quantity of the acid used is carefully regulated, since sulphuric acid of about 100% may give rise to carbonisation, which results in strong discolouration of the mixture and in a corresponding decrease in yield. When acids of the kind mentioned are used in a concentration of about 50% and the reaction temperature is kept below 40° C. a yield of the trimethyl pentanal of 60% is obtainable.

It has further been found that the yield of trimethyl pentanal may be increased very considerably by providing in the reaction mixture of acid and epoxy trimethyl pentane an organic solvent for the epoxide which solvent, however, is practically incapable of dissolving to any extent the acid and is not attacked thereby. Solvents of this kind are, for instance, hydrocarbons such as paraffins, olefines or aromatic hydrocarbons and naphthenes, or halogenated hydrocarbons such as chloroform and carbon tetrachloride; or higher ethers.

Alternative methods of using a solvent for the epoxide during the isomerisation process comprise suspending the acid in the solvent and gradually adding the epoxide, or adding the acid to the solution of the epoxide in the solvent. Other methods of carrying out the isomerisation in the presence of a solvent for the epoxide comprise either adding a solution of the epoxide to the agitated mixture of acid with the solvent, or by adding a mixture of the acid and solvent to the epoxide solution. Efficient agitation has to be provided in order to attain proper contact between the epoxide and the acid.

When the reaction is effected in the presence of such solvents, yields even up to 90% of trimethyl pentanal may be obtained, especially if the acid is used in a concentration of about 50%.

The ratio of solvent to the epoxide may vary within wide limits. Even very dilute epoxide solutions such as, for instance, a solution of 15% epoxide in cyclohexane yielded up to 92% yield of trimethyl pentanal. By using more concentrated solutions of epoxide, the yields are inclined to fall off appreciably. Thus, for instance, a 50% solution gave only 82% yield of the aldehyde.

The ratio of acid to the non-acid phase may also vary within very wide limits. When aqueous sulphuric acid of 50% concentration was used with a 25% percentage by volume epoxide solution in cyclohexane an aldehyde yield was obtained which did not alter very considerably when the ratio of the acid phase to the cyclohexane solution, i. e. the non-acid phase, varied between 1:1 and 1:100.

When the process is carried out with an epoxide dissolved in an organic solvent, sulphuric acid of very high concentrations, from 80 up to 100%, may be used without the risk of considerable decomposition and carbonisation provided the amount of sulphuric acid is very small. In such cases a few drops of the acid may be sufficient to achieve the desired production of the aldehyde.

The isomerisation according to the present invention may be carried out batchwise or in a continuous manner.

Instead of using a purified or concentrated epoxy-trimethyl pentane, the crude oxidate resulting from the oxidation of di-isobutene in the liquid phase by means of free oxygen-containing gases as is described in Patent 2,650,927, which is a continuation-in-part of Serial No. 149,642, filed March 14, 1950, now abandoned, may be used with good results.

The following examples serve to illustrate the manner in which the process of the invention can be carried out in practice:

Example 1

800 grams of a distilled epoxide fraction containing 90% of 1:2-epoxy-2:4:4-trimethylpentane was dissolved in benzene to produce a 25% solution. This solution was run during about 22 to 25 minutes into 2 litres of a 50% percentage by volume aqueous sulphuric acid. The reaction mixture was mechanically agitated and maintained at about 30° C. by cooling. After stirring for a further 2 to 3 minutes the upper layer separated, was shaken with about 40 cc. saturated aqueous potassium carbonate solution and then distilled. After removal of the benzene 2:4:4-trimethyl pentanal is obtained in a yield of 90% based on the 1:2-epoxide in the initial material.

Example 2

100 parts of a 25% solution of the epoxide in cyclohexane was mixed during 30 minutes with 1 part of 100% phosphoric acid. The mixture was treated as described in Example 1 and an aldehyde yield of 88% was obtained.

Example 3

2% weight by volume of dry powdered toluene sulphonic acid was added to a 25% solution of the epoxide in cyclohexane at 30° C. and a 54% yield of trimethyl pentanal was obtained.

Example 4

To 200 parts by weight of 50% percentage by volume aqueous sulphuric acid were added 50 parts by weight of an epoxide fraction containing 90% of 1:2-epoxy-2:4:4-trimethyl pentane; the temperature was maintained at 30° C. and the mixture stirred vigorously. The mixture was then treated as described in Example 1; the upper layer contained the aldehyde in a yield of about 55%.

Example 5

A 25% solution of the epoxide in cyclohexane was added at the bottom of a packed column which was cooled externally by water to about 30° C., whilst fresh aqueous sulphuric acid of 50% percentage by volume strength was introduced at the top of the column. The upper phase at the top was continuously removed. With a throughput rate of 460 grams of epoxide per hour, per litre of reactor space, a yield of the aldehyde of 82% of the theory resulted.

Example 6

200 parts by volume of a crude oxidate containing besides other oxidation products about 50 parts of 1:2-epoxy-2:4:4-trimethyl pentane and 100 parts by volume of unreacted di-isobutene was run into a reactor fitted with an agitator and containing 200 parts by volume of 50% percentage by volume aqueous sulphuric acid. The temperature was maintained below 30° C. by external water cooling. When the reaction was complete the two phases were separated and the upper phase distilled under reduced pressure. Unchanged di-isobutene came over first, followed by a small amount (5 to 6%) of methyl neopentyl ketone, and finally by trimethyl pentanal. The latter was obtained in 75% yield based on the epoxide used.

We claim:

1. Process for the manufacture of 2:4:4-trimethyl-pentanal which comprises bringing 1:2-epoxy-2:4:4-trimethyl-pentane in the presence of an organic solvent for said epoxy pentane substantially immiscible with water into intimate contact with an acid selected from the group consisting of sulphuric acid, phosphoric acid, and paratoluene sulphonic acid to form a 2-phase mixture, said acid having the concentration of about 50–100% while maintaining the temperature in the reaction mixture at below 40° C., sulphuric acid at about 100% strength being employed in very small quantities to avoid discoloration.

2. Process according to claim 1, wherein the inert organic solvent is a hydrocarbon.

3. Process according to claim 1, wherein the said solvent is a halogenated hydrocarbon.

4. Process according to claim 1, wherein the said solvent is a higher ether.

5. Process for the manufacture of 2:4:4-trimethyl pentanal, which comprises bringing a crude oxide containing 1:2-epoxy-2:4:4-trimethyl pentane and unreacted diisobutene, said crude oxidate being obtained by the oxidation of diisobutene with molecular oxygen, into intimate contact with an acid selected from the group consisting of sulphuric acid, phosphoric acid, and paratoluene sulphonic acid to form a 2-phase mixture, said acid having the concentration of about 50–100% while maintaining the temperature in the reaction mixture at below 40° C., sulphuric acid at about 100% strength being employed in very small quantities to avoid discoloration.

References Cited in the file of this patent

Byers et al., J. Chem. Soc., 1948 volume, pages 1328–1331.

Hickinbottom, J. Chem. Soc., 1948 volume, pages 1331–1333.

Faworski, Chem. Zentralblatt, vol. 1907, part I, pages 15–17.